(12) United States Patent
Takeuchi

(10) Patent No.: US 7,813,068 B2
(45) Date of Patent: Oct. 12, 2010

(54) DEGAUSS CONTROL FOR MAGNETIC DISK-DRIVE PREAMPLIFIER

(75) Inventor: Toru Takeuchi, Sagamihara (JP)

(73) Assignee: Texas Instruments Incorporated, Dallas, TX (US)

( * ) Notice: Subject to any disclaimer, the term of this patent is extended or adjusted under 35 U.S.C. 154(b) by 325 days.

(21) Appl. No.: 12/120,525

(22) Filed: May 14, 2008

(65) Prior Publication Data

US 2009/0284860 A1    Nov. 19, 2009

(51) Int. Cl.
*G11B 5/09* (2006.01)
(52) U.S. Cl. .......................................... 360/46
(58) Field of Classification Search ................... 360/46, 360/43, 25, 66, 68, 69, 75
See application file for complete search history.

(56) References Cited

U.S. PATENT DOCUMENTS

| | | | |
|---|---|---|---|
| 6,985,322 B2 | 1/2006 | Mian et al. | |
| 7,289,284 B2 * | 10/2007 | Arai et al. | 360/25 |
| 7,450,328 B2 * | 11/2008 | Yang | 360/66 |
| 7,515,371 B1 * | 4/2009 | Buch et al. | 360/66 |
| 7,701,657 B2 * | 4/2010 | Lee | 360/68 |
| 2005/0190476 A1 | 9/2005 | Wilson et al. | |
| 2006/0066973 A1 | 3/2006 | Fang et al. | |
| 2006/0158764 A1 | 7/2006 | Suzuki et al. | |
| 2006/0176597 A1 | 8/2006 | Ngo et al. | |
| 2007/0153410 A1 | 7/2007 | Hshizume et al. | |

* cited by examiner

*Primary Examiner*—Fred Tzeng
(74) *Attorney, Agent, or Firm*—Dawn V. Stephens; Wade James Brady, III; Frederick J. Telecky, Jr.

(57) ABSTRACT

One embodiment of the invention includes a preamplifier system for a magnetic disk-drive. The system includes a current distributor configured to generate a reference current and to decay the reference current from a first magnitude to a second magnitude during a degauss period to degauss a magnetic disk write head. The degauss period defines a transition from a write cycle to a read cycle of the magnetic disk-drive and has a predetermined time duration that is independent of the first magnitude of the reference current during the write cycle. An output driver is configured to provide a write current to the magnetic disk write head having a magnitude with an absolute value that is based on the reference current.

23 Claims, 5 Drawing Sheets

DEGAUSS CONTROL FOR MAGNETIC DISK-DRIVE PREAMPLIFIER

TECHNICAL FIELD

This invention relates to electronic circuits, and more specifically to degauss control for a magnetic disk-drive preamplifier.

BACKGROUND

Driver circuits and preamplifier circuits are used in numerous applications, such as for writing data to a magnetic medium. Due to the increasing demand for faster data transfer, some driver and preamplifier circuits may be required to support a very rapid data-rate. To support such an increase in data-rate for magnetic disk-drives, the recording density of the data-carrying magnetic dipoles on the magnetic disk can be increased. As a result, a greater amount of data can be read from and written to the magnetic disk at a given speed of rotation of the spindle motor of the magnetic disk-drive.

Such an increase in recording density of the magnetic disk has resulted in the use of perpendicular recording in which magnetic dipoles are perpendicular with respect to the plane of the magnetic disk. However, in implementing perpendicular recording, upon a transition from a write cycle in which data is being written to the magnetic disk and a read cycle in which data is being read from the magnetic disk, it may be necessary to degauss the magnetic disk write head. In degaussing the magnetic disk write head, the magnetic field that is induced on the magnetic disk write head can be substantially discharged. Accordingly, an associated magneto-resistive (MR) read head can read data from the magnetic disk without substantial interference from the residual magnetic field.

SUMMARY

One embodiment of the invention includes a preamplifier system for a magnetic disk-drive. The system includes a current distributor configured to generate a reference current and to decay the reference current from a first magnitude to a second magnitude during a degauss period to degauss a magnetic disk write head. The degauss period defines a transition from a write cycle to a read cycle of the magnetic disk-drive and has a predetermined time duration that is independent of the first magnitude of the reference current during the write cycle. An output driver is configured to provide a write current to the magnetic disk write head having a magnitude with an absolute value that is based on the reference current. The write current can be provided with a polarity to correspond to data being written to an associated magnetic disk during the write cycle.

Another embodiment of the invention includes a method for degaussing a magnetic disk write head in a magnetic disk-drive. The method comprises initiating a degauss period in response to a degauss control signal in response to concluding a write cycle associated with the magnetic disk-drive. The method also comprises decoupling a current-mirror that comprises a first mirror transistor that is configured to conduct a magnitude control current and a second mirror transistor configured to conduct a reference current that is provided to cause data to be written to the magnetic disk write head via at least one output driver. The method also comprises generating a decay current that flows from a bias terminal of the second mirror transistor. The decay current can have a magnitude that is proportional to a square-root of an initial magnitude of the reference current. The method further comprises decaying the reference current from the initial magnitude to a predetermined threshold magnitude during the degauss period in response to the decay current.

Another embodiment of the invention includes a current distribution system for a magnetic disk-drive. The system includes means for generating at least one reference current based on an input control signal. The system also includes means for driving at least one write current to a respective at least one magnetic disk write head during a write cycle, the at least one write current having a magnitude depending on the at least one reference current. The system also includes means for decaying the at least one reference current during a degauss period from a first magnitude to a second magnitude so that the write current decreases proportionally. The degauss period defines a transition from the write cycle to a read cycle of the magnetic disk-drive and having a predetermined time duration that is independent of the first magnitude of the reference current during the write cycle.

DETAILED DESCRIPTION

Figure 1:
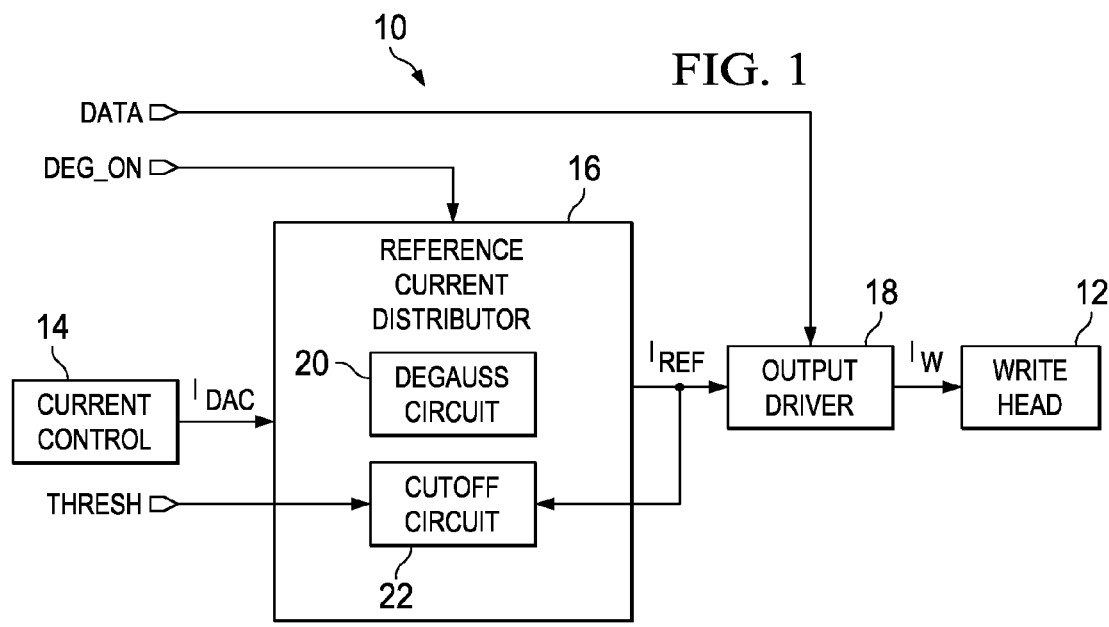
FIG. 1 illustrates an example of a preamplifier system in accordance with an aspect of the invention.

The invention relates to electronic circuits, and more specifically to degauss control for a magnetic disk-drive preamplifier. A preamplifier circuit for a magnetic disk drive includes a reference current distributor that can receive a control signal that sets an absolute magnitude of a write current corresponding to data to be written to the magnetic disk, and can generate a reference current based on the control signal that is provided to the magnetic disk write head as a write current via an output driver. As an example, the control signal can be a control current that can be mirrored as the reference current. Upon the conclusion of a write cycle, to provide a transition to a read cycle, a signal can be provided to initiate a degauss period. The signal can control one or more switches, such as to decouple the current-mirror between the control current and the reference current and to activate a degauss circuit.

Upon initiation of a degauss period, a current is generated that is proportional to the control current, and thus proportional to an initial magnitude of the reference current. As an example, the proportional current can be mirrored from the control current, and can thus be substantially equal to the initial magnitude of the reference current. The proportional current is provided to a degauss circuit in the reference current distributor. The degauss circuit is configured to generate a decay current based on the proportional current, such that the decay current is functionally related to the initial magnitude reference current. As an example, the decay current can be approximately equal to a square-root of a product of the proportional current and a constant. The constant can correspond to a predetermined substantially fixed current that is generated in the degauss circuit and can have a magnitude that is set to define the time duration of the degauss period.

The decay current flows to or from the gate of a transistor through which the reference current flows, depending on whether the transistor is N-type or P-type. Therefore, the transistor is gradually deactivated by the flow of the decay current, such as by discharging a gate capacitor, at a rate that is based on the magnitude of the reference current. As a result, the reference current, and thus the write current, is likewise decayed at a rate that is based on the initial magnitude of the reference current. Because the decay current has a magnitude that is functionally related to the initial magnitude of the reference current, the degauss period has a time duration that is independent of the initial magnitude of the reference current. As a result, the time for a degauss period can be accurately controlled (e.g., based on the constant current) regardless of the amount of write current that is provided to the magnetic disk write head. A threshold magnitude can be set for the reference current, such that the reference current can be deactivated substantially completely upon the magnitude of the reference current decreasing to the threshold magnitude. Accordingly, the magnetic field that is induced in the magnetic disk write head can be substantially discharged prior to deactivating the reference current to initiate a read operation.

FIG. 1 illustrates an example of a preamplifier system 10 in accordance with an aspect of the invention. The preamplifier system 10 can be implemented in a magnetic disk-drive system, such that the preamplifier system 10 can be implemented to write data onto a magnetic disk (not shown) via a magnetic disk write head 12. As an example, the preamplifier system 10 can be implemented in a hard-drive system or in a peripheral disk-drive system. Specifically, the preamplifier system 10 can be implemented in a high recording density disk-drive that is configured to implement perpendicular recording, such that the magnetic dipoles are perpendicular with respect to the plane of the magnetic disk.

The preamplifier system 10 includes a current controller 14. As an example, the current controller 14 can include a digital-to-analog converter (DAC) that converts a digital current magnitude control signal into an analog form. Thus, the current controller 14 provides an analog control current $I_{DAC}$ that is indicative of a magnitude setting for a write current $I_W$ that writes data to the magnetic disk. For example, the current controller 14 can set a magnitude of the control current $I_{DAC}$ to optimize the magnetic disk write head 12 to a given environment, and can thus vary based on temperature and/or write head characteristics. For a given write cycle, the control current $I_{DAC}$ can therefore be substantially constant.

The control current $I_{DAC}$ is provided to a reference current distributor 16. The reference current distributor 16 can be configured to generate a reference current $I_{REF}$ based on the control current $I_{DAC}$. The reference current $I_{REF}$ can be generated to be substantially proportional to the control current $I_{DAC}$ during a write cycle. As an example, the reference current $I_{REF}$ can be generated via a current-mirror from the control current $I_{DAC}$. The reference current $I_{REF}$ is provided to an output driver 18 that drives the reference current $I_{REF}$ as a write current $I_W$ based on a digital data signal DATA. Therefore, the reference current $I_{REF}$ provides an absolute value magnitude of the write current $I_W$, which is modulated by the digital data signal DATA.

As an example, the write current $I_W$ is provided to a bi-directional inductive load in the magnetic disk write head 12, such that a magnetic field generated by the inductive load can set magnetic dipole elements on the magnetic disk corresponding to the data being written. For example, the write current $I_W$ can have a magnitude that is substantially centered at zero amps, such that positive values of the write current $I_W$ correspond to one binary state of the data to be written to the magnetic disk and negative values of the write current $I_W$ correspond to the other binary state of the data to be written to the magnetic disk. The write current $I_W$ can also include overshoot at transitions from one binary state to the other, such that the magnetic field generated by the inductive load at the magnetic disk write head 12 can be substantially rapidly reversed.

Data is written to the magnetic disk during a write cycle and is read from the disk during a read cycle. As described above, the preamplifier system 10 can be implemented in a high recording density disk-drive, such as configured to implement perpendicular recording. As a result, in a transition from a write cycle to a read cycle, the reference current distributor 16 is configured to decay the reference current $I_{REF}$ to degauss (i.e., demagnetize) the write head 12 during a degauss period that defines a transition between the write cycle and the read cycle. As described in greater detail below, a time duration of the degauss period can be set substantially independent of the initial magnitude of the reference current $I_{REF}$, and thus the write current $I_W$, to provide for accurate and timely degaussing of the write head 12.

The reference current distributor 16 includes a degauss circuit 20. A signal DEG_ON is provided to the reference current distributor 16 to initiate a degauss period, and thus to activate the degauss circuit 20. As an example, the signal DEG_ON can be provided to one or more switches in the reference current distributor 16 to decouple the reference current $I_{REF}$ from the control current $I_{DAC}$, such as by decoupling the associated current-mirror, and/or to couple the degauss circuit 20 to the associated transistor through which the current $I_{REF}$ flows. Upon initiation of the degauss period, the degauss circuit 20 is thus configured to decay the reference current $I_{REF}$ from an initial magnitude to a predetermined final value.

As described above, the time duration of the degauss period can be set substantially independent of the initial magnitude of the reference current $I_{REF}$, and thus also independent of the absolute value magnitude of the write current $I_W$ during the preceding write cycle. Specifically, the rate of decay of the reference current $I_{REF}$ can be based on the initial magnitude of the reference current $I_{REF}$. As an example, the degauss circuit 20 can be configured to generate a decay current that flows to or from a gate of the transistor through which the reference current $I_{REF}$ flows (i.e., depending on whether the transistor is N-type or P-type). The decay current can have a magnitude that is functionally related to the initial magnitude of the reference current $I_{REF}$ during the degauss period. As a result, the biasing of the transistor is decreased (i.e., gradually deactivated) at a rate that is dependent on the initial magnitude of the reference current $I_{REF}$, thus setting a time duration of the degauss period that is independent of the initial magnitude of the reference current $I_{REF}$. Accordingly, regardless of the magnitude of the reference current $I_{REF}$, and thus the write current $I_W$, the degauss period has a consistent time duration. Therefore, variations in the magnitude of the write current $I_W$ (e.g., between approximately 10 to 60 mA) are irrelevant to a determination of a time necessary to degauss the magnetic disk write head 12, such that the magnetic disk write head 12 can be degaussed rapidly and accurately in switching from a write cycle to a read cycle.

The reference current distributor 16 includes a cutoff circuit 22 that is configured to monitor the reference current $I_{REF}$. The example of FIG. 1 demonstrates the reference current $I_{REF}$ being provided to the cutoff circuit 22. As an example, the reference current $I_{REF}$ can be mirrored to the cutoff circuit 22. In addition, a signal THRESH can be provided to the cutoff circuit 22 that is indicative of a threshold magnitude associated with the predetermined final value of the reference current $I_{REF}$. The threshold magnitude can be a ratio or percent of the magnitude of the reference current $I_{REF}$ (e.g., 5-20%). As an example, the cutoff circuit 22 can include a comparator, such that the magnitude of the reference current $I_{REF}$ can be compared with the threshold magnitude that is set by the signal THRESH. As such, upon the reference current $I_{REF}$ decaying to a magnitude that is approximately equal to the threshold magnitude, the cutoff circuit 22 deactivates the reference current $I_{REF}$, thus concluding the degauss period and initiating the read cycle. Accordingly, the signal THRESH can define a magnitude of the reference current $I_{REF}$ at which the magnetic field of the write head 12 is substantially sufficiently discharged.

It is to be understood that the preamplifier system 10 is not intended to be limited to the example of FIG. 1. As an example, as demonstrated further in the example of FIG. 5 below, the reference current distributor 16 can be configured to selectively distribute the reference current $I_{REF}$ to a plurality of separate magnetic disk write heads. As an other example, the degauss circuit 20 and the cutoff circuit 22 need not be configured as part of the reference current distributor 16, but can be separate and independent circuits. As a further example, it is to be understood that one or more of the components in the preamplifier system 10 can be integrated components. Specifically, the reference current distributor 16 can be configured as an integrated circuit (IC), which can also include the current controller 14 and/or the output driver 18.

Figure 2:
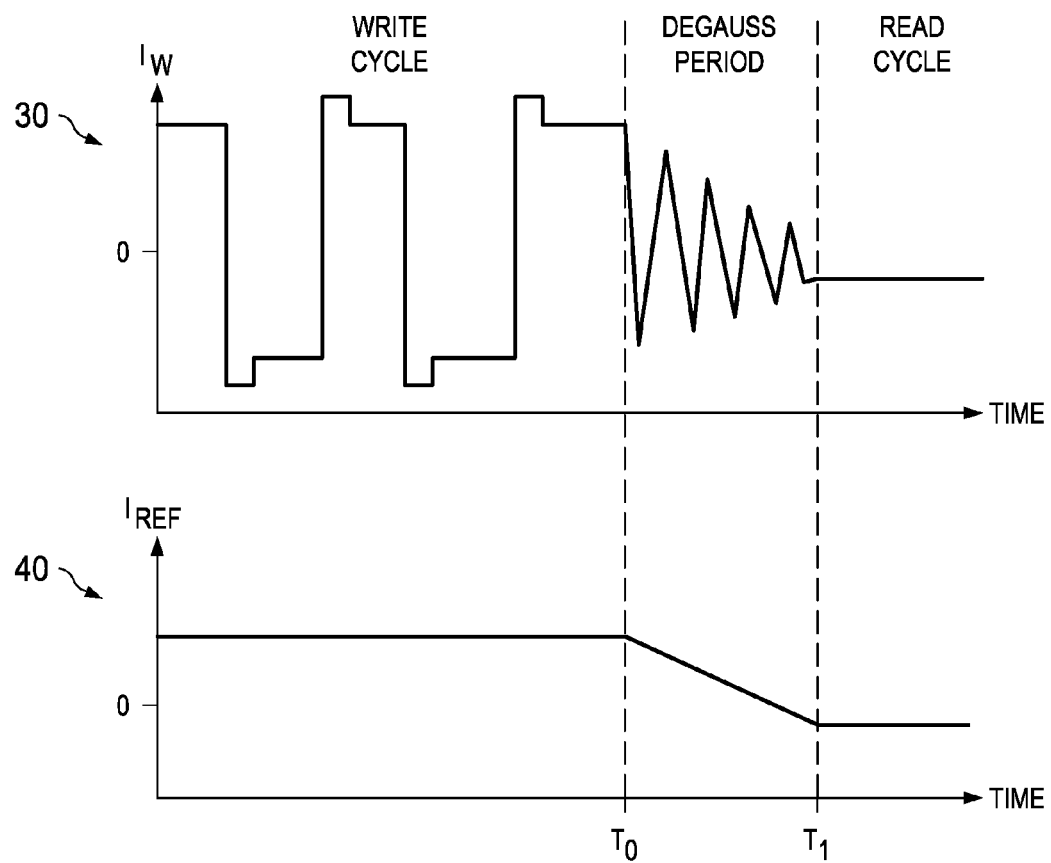
FIG. 2 illustrates an example of timing diagrams associated with a preamplifier system in accordance with an aspect of the invention.

FIG. 2 illustrates an example of timing diagrams 30 and 40 associated with the preamplifier 10 in the example of FIG. 1 in accordance with an aspect of the invention. The timing diagram 30 plots the write current $I_W$ against time and the timing diagram 40 plots the reference current $I_{REF}$ against time.

At a time prior to a time $T_0$, the preamplifier system 10 is in a write cycle of operation, and is thus writing data to the magnetic disk via the magnetic disk write head 12. As such, the write current $I_W$ is demonstrated in the example of FIG. 1 as having a magnitude that is substantially centered at zero amps, such that positive values of the write current $I_W$ correspond to one binary state of the data to be written to the magnetic disk and negative values of the write current $I_W$ correspond to the other binary state of the data to be written to the magnetic disk. The write current $I_W$ is also demonstrated as having overshoot at transitions between binary states, such that the magnetic field generated by the inductive load at the magnetic disk write head 12 can be substantially rapidly reversed. The reference current $I_{REF}$ is thus demonstrated in the example of FIG. 2 as having a magnitude that is proportional to an absolute value of the write current $I_W$. As an example, the reference current $I_{REF}$ could have a magnitude that is approximately equal to the absolute value magnitude of the write current $I_W$.

At the time $T_0$, the preamplifier system 10 concludes the write cycle and initiates a degauss period. Thus, as demonstrated in the timing diagram 40, the reference current $I_{REF}$ begins to decay, such as based on the generation of a decay current that flows to or from a gate of the transistor through which the reference current $I_{REF}$ flows. As a result, the reference current $I_{REF}$ decreases. In response, the absolute value of the write current $I_W$ likewise decreases. In the example of FIG. 2, the write current $I_W$ is toggled between positive and negative values, such as in response to the data signal DATA. As a result, the current $I_W$ is decreased to substantially decrease the magnitude of the magnetic field through the inductive load of the magnetic disk write head 12. Accordingly, the magnetic disk write head 12 becomes substantially degaussed during the degauss period.

The degauss period ends at a time $T_1$. For example, at the time $T_1$, the cutoff circuit 22 can assert a signal to deactivate the generation of the reference current $I_{REF}$. Accordingly, the reference current $I_{REF}$ is demonstrated in the example of FIG. 2 as reducing to a magnitude of zero at the time $T_1$. It is to be understood that, although the reference current $I_{REF}$ is demonstrated in the example of FIG. 2 as reducing to a magnitude of zero in the degauss period, it is to be understood that the reference current $I_{REF}$ could be reduced to a magnitude that is greater than zero at the time $T_1$. Thus, at the time $T_1$, the reference current $I_{REF}$ could be reduced to zero based on the cutoff circuit 22. Therefore, likewise, the write current $I_W$ also has a magnitude that is approximately zero. Accordingly, beginning at the time $T_1$, the preamplifier system 10 enters a read cycle, such that an associated magneto-resistive (MR) read head can read data from the magnetic disk without substantial magnetic interference.

It is to be understood that the timing diagrams 30 and 40 are demonstrated as ideal timing diagrams in the example of FIG. 2 for simplicity. As such, variations in respective magnitudes of the reference current $I_{REF}$ and the write current $I_W$ may not be demonstrated in the example of FIG. 2. Accordingly, the timing diagrams 30 and 40 in the example of FIG. 2 are merely demonstrative of the relative magnitudes of the write current $I_W$ and the reference current $I_{REF}$, respectively.

Figure 3:
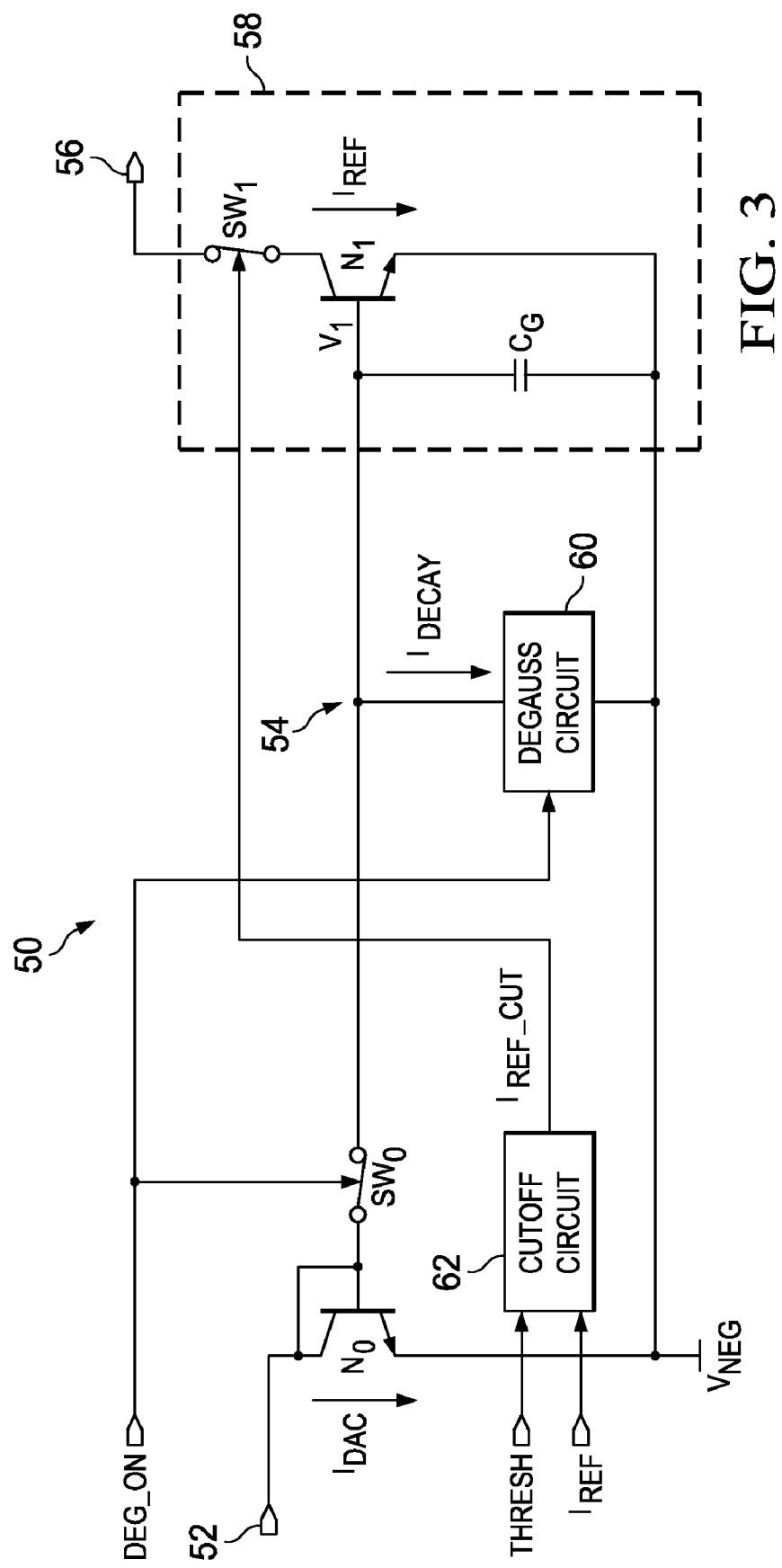
FIG. 3 illustrates an example of a reference current generator in accordance with an aspect of the invention

FIG. 3 illustrates an example of a reference current distributor 50 in accordance with an aspect of the invention. The reference current distributor 50 can be configured substantially similar to the reference current distributor 16 in the example of FIG. 1. As such, reference is to be made to the example of FIG. 1 in the following description of the example of FIG. 3.

The reference current distributor 50 includes an input 52 on which the control current $I_{DAC}$ is provided. As an example, the control current $I_{DAC}$ can be provided from the current controller 14 in the example of FIG. 1. Therefore, the control current $I_{DAC}$ can be a current that is indicative of a magnitude of an absolute value of the write current $I_W$. The control current $I_{DAC}$ flows through an N-type field effect transistor (FET) $N_0$. The N-FET $N_0$ is demonstrated in the example of FIG. 3 as having a gate and a drain that are coupled together and a source that is coupled to a negative rail voltage $V_{NEG}$. As an example, the negative rail voltage $V_{NEG}$ can be ground or can be a negative voltage relative to ground. Therefore, the N-FET $N_0$ is diode-connected and conducts the control current $I_{DAC}$ from the input 52 to the negative rail voltage $V_{NEG}$.

The gate of the N-FET $N_0$ is also coupled to the gate of an N-type transistor $N_1$ at a node 54 via a switch $SW_0$. In the example of FIG. 3, the switch $SW_0$ is demonstrated as closed, such as during a write cycle. The N-FET $N_1$ interconnects an output 56 of the reference current distributor 50 at a drain via a switch $SW_1$ and the negative rail voltage $V_{NEG}$ at a source. The N-FET $N_0$ and the N-FET $N_1$ thus collectively form a current-mirror. The gate of the N-FET $N_1$ is also interconnected with the negative rail voltage $V_{NEG}$ via a gate capacitor $C_G$. Thus, the gate capacitor $C_G$ is configured to maintain a voltage $V_1$ on the gate of the N-FET $N_1$. In the example of FIG. 3, the N-FET $N_1$, the switch $SW_1$, and the gate capacitor $C_G$ collectively form a reference current portion 58 of the reference current distributor 50.

In the example of FIG. 3, the N-FET $N_1$ conducts the reference current $I_{REF}$ from the output 56, such as from the output driver 18 in the example of FIG. 1, to the negative rail voltage $V_{NEG}$. Based on the current-mirror configuration of the N-FETs $N_0$ and $N_1$, the reference current $I_{REF}$ is generated as a mirrored current having a magnitude that is proportional to the magnitude of the control current $I_{DAC}$ during the write cycle. As an example, the N-FETs $N_0$ and $N_1$ can be configured as substantially identical, such that the reference current $I_{REF}$ and the control current $I_{DAC}$ can have approximately equal magnitudes. As another example, the reference current $I_{REF}$ and the control current $I_{DAC}$ can have magnitudes that are proportional based on a width-to-length (W/L) size ratio difference of the respective N-FETs $N_1$ and $N_0$.

The reference current distributor 50 also includes a degauss circuit 60. The degauss circuit 60 interconnects the node 54 and the negative rail voltage $V_{NEG}$. The degauss circuit 60 is configured to decay the reference current $I_{REF}$ from an initial magnitude to a final magnitude during the degauss period, such as in response to the signal DEG_ON. The initial magnitude of the reference current $I_{REF}$ can be proportional to the control current $I_{DAC}$ based on the proportionality of the reference current $I_{REF}$ to the control current $I_{DAC}$ during the write cycle. The final magnitude of the reference current $I_{REF}$ can be based on a threshold value, such as a percentage of the initial magnitude as described below. As such, the write current $I_W$ that is provided to the magnetic disk write head 12 in the example of FIG. 1 is likewise decayed to substantially discharge the magnetic field of the inductive load of the magnetic disk write head 12.

In the example of FIG. 3, the switch $SW_0$ is also controlled by the signal DEG_ON. As an example, upon the conclusion of the write cycle, the signal DEG_ON can be asserted to initiate the degauss period. As a result, the switch $SW_0$ changes states, such that the switch $SW_0$ is opened. The opening of the switch $SW_0$ thus decouples the current-mirror by decoupling the gate of the N-FET $N_0$ from the node 54. Thus the gates of the N-FETs $N_0$ and $N_1$ are disconnected during the degauss period. Accordingly, the reference current $I_{REF}$ is no longer proportional to the control current $I_{DAC}$ during the degauss period. In addition, the signal DEG_ON activates the degauss circuit 60. In response, the degauss circuit 60 generates a decay current $I_{DECAY}$ that flows from the node 54. As a result, the voltage $V_1$ across the gate capacitor $C_G$, corresponding to the gate-source voltage $V_{GS}$ of the N-FET $N_1$, is discharged by the decay current $I_{DECAY}$, thus decreasing the voltage $V_1$. In response, the N-FET $N_1$ begins to gradually deactivate, which begins to decay the magnitude of the reference current $I_{REF}$.

The decay current $I_{DECAY}$ can have a magnitude that is functionally related to an initial magnitude of the reference current $I_{REF}$, such as by biasing the degauss circuit with a current that is proportional to the control current $I_{DAC}$. As a result, the rate of decrease of the voltage $V_1$ is based on the initial magnitude of the reference current $I_{REF}$. Accordingly, the amount of time for the reference current $I_{REF}$ to decay from an initial value to a predetermined threshold value, such as defining the degauss period, is consistent regardless of the initial value of the reference current $I_{REF}$, and thus the write current $I_W$. In other words, the time duration of the degauss period is independent of the initial magnitude of the reference current $I_{REF}$. The following equations demonstrate this concept.

The magnitude of the reference current $I_{REF}$ can be defined as follows:

$$I_{REF} = (\mu * C_{OX} * W * (V_{GS} - V_{TH})^2) / (2 * L) \qquad \text{Equation 1}$$

Where:
$\mu$ is the channel mobility of the transistor $N_1$,
$C_{OX}$ is the gate oxide-capacitance per unit area of the transistor $N_1$,
W is the width of the transistor $N_1$,
L is the length of the transistor $N_1$,
$V_{GS}$ is the gate-source voltage of the transistor $N_1$ (i.e., $V_1$), and
$V_{TH}$ is the threshold voltage of the transistor $N_1$.

Therefore, the initial magnitude of the reference current $I_{REF}$ (i.e., $I_{REF\_INIT}$) and the final magnitude of the reference current $I_{REF}$ (i.e., threshold magnitude $I_{REF\_FINAL}$) of the reference current can be defined by the following equations:

$$I_{REF\_INIT} = K * (V_{1\_INIT} - V_{TH})^2 \qquad \text{Equation 2}$$

$$I_{REF\_FINAL} = K * (V_{1\_FINAL} - V_{TH})^2 \qquad \text{Equation 3}$$

Where:
$K = (\mu * C_{OX} * W) / (2 * L)$,
$V_{1\_INIT}$ is the initial magnitude of the voltage $V_1$, and
$V_{1\_FINAL}$ is the final magnitude of the voltage $V_1$.

Therefore, Equations 2 and 3 can be combined as follows:

$$V_{1\_INIT} - V_{1\_FINAL} = (I_{REF\_INIT}/K)^{1/2} - (I_{REF\_FINAL}/K)^{1/2} \qquad \text{Equation 4}$$

As described above, the threshold magnitude of the reference current $I_{REF}$ can be a ratio (e.g., 5-20%) of the initial magnitude of the reference current $I_{REF}$. Assuming that the threshold magnitude $I_{REF\_FINAL}$ of the reference current $I_{REF}$ is 10% of the initial magnitude $I_{REF\_INIT}$, Equation 4 can be rewritten as follows:

$$I_{REF\_FINAL} = 0.1 * I_{REF\_INIT} \qquad \text{Equation 5}$$

$$V_{1\_INIT} - V_{1\_FINAL} = (1 - (10)^{-1/2}) * (I_{REF\_INIT}/K)^{1/2} \qquad \text{Equation 6}$$

As described above, the time duration of the degauss period can be defined by the amount of time for the reference current $I_{REF}$ to decay from the initial magnitude $I_{REF\_INIT}$ to the threshold magnitude $I_{REF\_FINAL}$. Therefore, the time duration of the degauss period can be defined as follows:

$$T_D = C_G * (V_{1\_INIT} - V_{1\_FINAL}) / (I_{DECAY}) \qquad \text{Equation 7}$$

Where:
$T_D$ is the time duration of the degauss period,
$C_G$ is the capacitance value of the capacitor $C_G$.

Accordingly, substituting Equation 6 into Equation 7, a time duration of the degauss period $T_D$ can be defined as follows:

$$T_D = C_G * (1 - (10)^{-1/2}) * (I_{REF\_INIT}/K)^{1/2} / I_{DECAY} \qquad \text{Equation 8}$$

As a result, it is thus demonstrated in Equation 8 that if the decay current $I_{DECAY}$ is proportional to the term $(I_{REF\_INIT})^{1/2}$, then the time duration of the degauss period is independent of the initial magnitude $I_{REF\_INIT}$ of the reference current $I_{REF}$.

The reference current distributor 50 includes a cutoff circuit 62 that is configured to monitor the magnitude of the reference current $I_{REF}$. The signal THRESH is provided to the cutoff circuit 62 that is indicative of the threshold magnitude (i.e., $I_{REF\_FINAL}$) associated with the predetermined final value of the reference current $I_{REF}$. As such, upon the reference current $I_{REF}$ decaying to the threshold magnitude $I_{REF\_FINAL}$, the cutoff circuit 62 asserts a signal $I_{REF}$_CUT that is provided to the switch $SW_1$. Therefore, the switch $SW_1$ opens to cease the flow of the reference current $I_{REF}$, thus concluding the degauss period and initiating the read cycle. As another example, the signal $I_{REF\_CUT}$ can be provided to other control circuitry (not shown) to facilitate a transition to a read cycle. Accordingly, the write head 12 is substantially sufficiently demagnetized for the MR head to begin reading the data from the magnetic disk without substantial magnetic interference.

The reference current distributor 50 is not intended to be limited to the example of FIG. 1. As an example, although the reference current distributor 50 is demonstrated using N-FETs $N_0$ and $N_1$ to sink the control current $I_{DAC}$ and the reference current $I_{REF}$ to the negative rail voltage $V_{NEG}$, it is to be understood that the reference current distributor 50 could instead include P-type FETs that source the control current $I_{DAC}$ and the reference current $I_{REF}$ from a positive rail voltage $V_{POS}$ (not shown). Therefore, the degauss circuit 60 could provide the decay current $I_{DECAY}$ to the node 54 to charge the capacitor $C_G$ instead of discharging it. As a result, a P-type FET through which the reference current $I_{REF}$ flows would still be deactivated throughout the degauss period, similar to as described above. In addition, the switch $SW_1$ is but one example of any of a variety of ways to cease the flow of the reference current $I_{REF}$ in response to the magnitude of the reference current $I_{REF}$ achieving the threshold magnitude. Furthermore, it is to be understood that the reference current distributor 50 can be configured as an IC. Accordingly, the reference current distributor 50 can be configured in any of a variety of ways.

Figure 4:
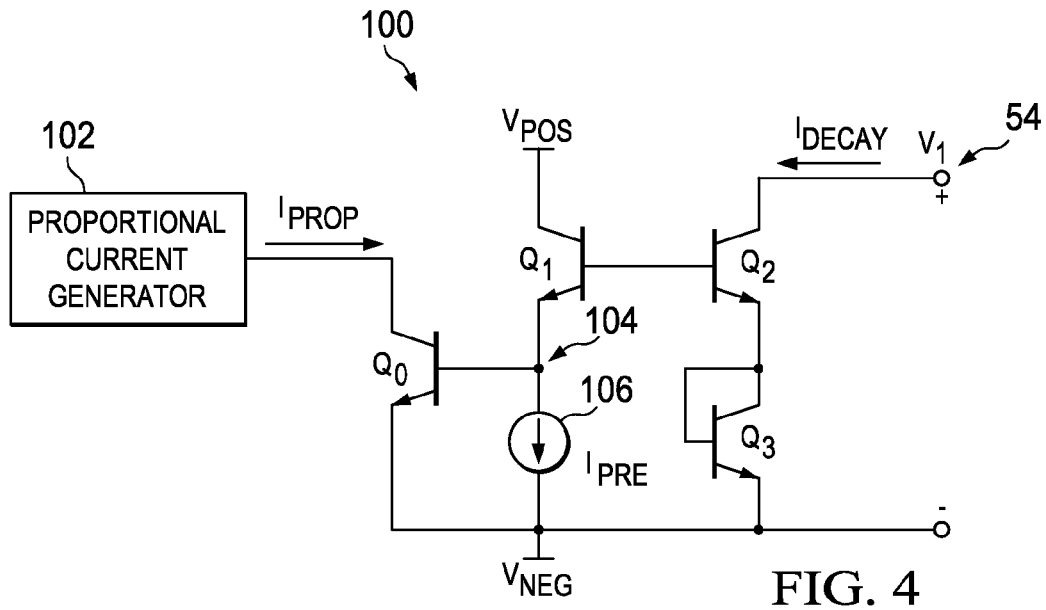
FIG. 4 illustrates an example of a degauss circuit in accordance with an aspect of the invention.

FIG. 4 illustrates an example of a degauss circuit 100 in accordance with an aspect of the invention. The degauss circuit 100 can be configured substantially the same as the degauss circuit 20 in the example of FIG. 1 and the degauss circuit 60 in the example of FIG. 3. As such, reference is to be made to the examples of FIGS. 1 and 3 in the following description of the example of FIG. 4.

The degauss circuit 100 includes a proportional current generator 102 that is configured to generate a current $I_{PROP}$. The current $I_{PROP}$ is a current that is proportional in magnitude to the control current $I_{DAC}$. As an example, the proportional current generator 102 can be a current-mirror that mirrors the control current $I_{DAC}$ to the degauss circuit 100. As a result, the current $I_{PROP}$ can be approximately equal to the control current $I_{DAC}$, or can be proportional based on a ratio of size mismatch between the N-FET $N_0$ and an associated transistor through which the current $I_{PROP}$ flows.

The current $I_{PROP}$ flows through an NPN-type bipolar junction transistor (BJT) $Q_0$. The transistor $Q_0$ has an emitter coupled to the negative rail voltage $V_{NEG}$ and a base that is coupled to a node 104. Thus, the transistor $Q_0$ forms a first current path through which the current $I_{PROP}$ flows. The degauss circuit 100 also includes an NPN-type BJT $Q_1$ that has a collector coupled to a positive rail voltage $V_{POS}$ and an emitter coupled to the node 104. A current source 106 generates a substantially constant current $I_{PRE}$ that flows from the node 104 to the negative rail voltage $V_{NEG}$. Thus, the transistor $Q_1$ provides a second current path through which the substantially constant current $I_{PRE}$ flows. As described below, the substantially constant current $I_{PRE}$ can be selected to set the time duration of the degauss period.

The transistor $Q_1$ has a base that is coupled to a base of an NPN-type BJT $Q_2$. The transistor $Q_2$ has a collector that is coupled to the node 54 in the example of FIG. 3 and an emitter that is coupled to a collector and base of an NPN-type BJT $Q_3$. The transistor $Q_3$ has an emitter coupled to the negative rail voltage $V_{NEG}$, and is diode-connected based on the coupling of the base and collector. Therefore, as demonstrated in the example of FIG. 4, the transistors $Q_2$ and $Q_3$ provide a third current path through which the decay current $I_{DECAY}$ flows from the node 54 to the negative rail voltage $V_{NEG}$. As a result, the voltage $V_1$ decreases based on the discharge of the capacitor $C_G$ (e.g., as demonstrated in the example of FIG. 3). In the example of FIG. 4, it is to be understood that the transistors $Q_0$ through $Q_3$ can all be configured substantially identical to each other.

As described above regarding Equation 8, if the decay current $I_{DECAY}$ is proportional to the term $(I_{REF\_INIT})^{1/2}$, then the time duration of the degauss period is independent of the initial magnitude $I_{REF\_INIT}$ of the reference current $I_{REF}$. The degauss circuit 100 is thus configured to generate the decay current $I_{DECAY}$ as having a magnitude that is approximately equal to the square-root of the product of the initial magnitude $I_{REF\_INIT}$ of the reference current $I_{REF}$ and a constant (i.e., the substantially constant current $I_{PRE}$). This is demonstrated based on the following equations.

Based on the configuration of the transistors $Q_0$ through $Q_3$, the base-emitter voltages of the transistors $Q_0$ through $Q_3$ can be defined as follows:

$$V_{BE0}+V_{BE1}=V_{BE2}+V_{BE3} \quad \text{Equation 9}$$

Where:
 $V_{BE0}$ is the base-emitter voltage of the transistor $Q_0$,
 $V_{BE1}$ is the base-emitter voltage of the transistor $Q_1$,
 $V_{BE2}$ is the base-emitter voltage of the transistor $Q_2$, and
 $V_{BE3}$ is the base-emitter voltage of the transistor $Q_3$.

Therefore, Equation 9 can be rewritten as follows:

$$V_T * \ln(I_{C0}/I_{S0}) + V_T * \ln(I_{C1}/I_{s1}) = V_T * \ln(I_{C2}/I_{S2}) + V_T * \ln(I_{C3}/I_{S3}) \quad \text{Equation 10}$$

Where:
 $V_T$ is the thermal voltage of the transistors $Q_0$ through $Q_3$ (i.e., $=kT/q$, where k is Boltzman's constant, T is temperature in Kelvin, and q is electronic charge),
 $I_{C0}$ through $I_{C3}$ is the respective collector currents of the transistors $Q_0$ through $Q_3$, and
 $I_{S0}$ through $I_{S3}$ is the respective collector saturation reverse currents of the transistors $Q_0$ through $Q_3$.

As described above, the transistors $Q_0$ through $Q_3$ can all be configured substantially identical to each other. As a result, the collector saturation reverse currents $I_{S0}$ through $I_{S3}$ are all approximately equal. In addition, because the transistors $Q_2$ and $Q_3$ conduct the decay current $I_{DECAY}$, then ignoring base current and Early effect, the collector currents $I_{C2}$ and $I_{C3}$ are approximately equal. Accordingly, Equation 10 can be rewritten as follows:

$$I_{C0} * I_{C1} = I_{C2}^2 \quad \text{Equation 11}$$

Because the collector current $I_{C0}$ is the current $I_{PROP}$, the collector current $I^{C1}$ is the substantially constant current $I_{PRE}$, and the collector current $I_{C2}$ is the decay current $I_{DECAY}$, Equation 11 can be rewritten as follows:

$$I_{DECAY} = (I_{PROP} * I_{PRE})^{1/2} \quad \text{Equation 12}$$

Therefore, the decay current $I_{DECAY}$ is demonstrated by Equation 12 to be proportional to a square-root of the current $I_{PROP}$. As described above, the current $I_{PROP}$ is proportional to the control current $I_{DAC}$. Accordingly, the decay current $I_{DECAY}$ is proportional to a square-root of the initial magnitude $I_{REF\_INIT}$ of the reference current $I_{REF}$, thus satisfying the independence of the initial magnitude $I_{REF\_INIT}$ of the reference current $I_{REF}$ regarding the time duration of the degauss period $T_D$, as described in Equation 8 above. Furthermore, because the substantially constant current $I_{PRE}$ is a substantial constant in Equation 12, the magnitude of the substantially constant current $I_{PRE}$ can thus be selected to adjust the magnitude of the decay current $I_{DECAY}$ relative to the current $I_{PROP}$. As a result, the magnitude of the substantially constant current $I_{PRE}$ can be selected to adjust the time duration of the degauss period, as also described in Equation 8 above.

It is to be understood that the degauss circuit 100 is not intended to be limited to the example of FIG. 4. As an example, other arrangements of the transistors $Q_0$ through $Q_3$ are conceivable to achieve the square-root proportional relationship between the decay current $I_{DECAY}$ and the current $I_{PROP}$. In addition, although the signal DEG_ON is not demonstrated in the example of FIG. 4, the signal DEG_ON can be provided to the degauss circuit 100 in any of a variety of ways to activate the degauss circuit 100. As an example, the signal DEG_ON can activate the proportional current generator 102, or can create the first, second, and third current paths for the respective currents $I_{PROP}$, $I_{PRE}$, and $I_{DECAY}$ by closing a switch to couple the negative rail voltage $V_{NEG}$ to the degauss circuit 100. Accordingly, the degauss circuit 100 can be configured in any of a variety of ways.

Figure 5:
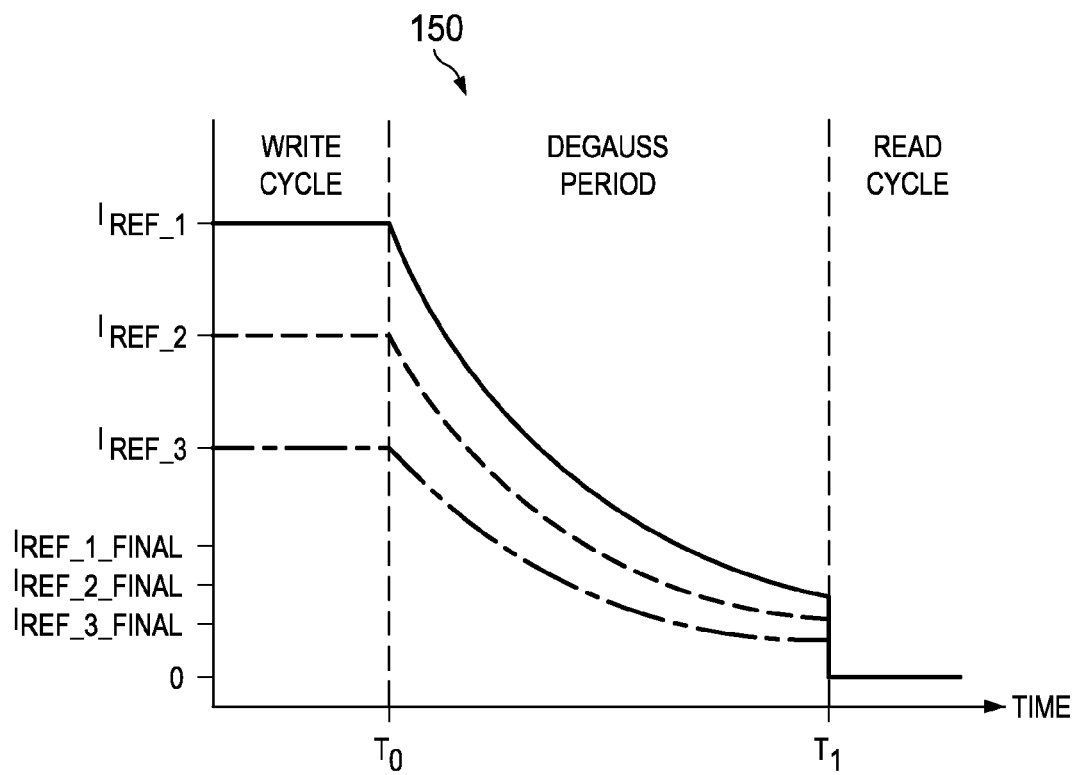
FIG. 5 illustrates an example of a timing diagram in accordance with an aspect of the invention.

FIG. 5 illustrates an example of a timing diagram 150 in accordance with an aspect of the invention. The timing diagram 150 plots the reference current $I_{REF}$ against time. Specifically, the timing diagram 150 demonstrates three separate initial values of the reference current $I_{REF}$, demonstrated in the example of FIG. 5 as reference currents $I_{REF\_1}$, $I_{REF\_2}$, and $I_{REF\_3}$ in descending magnitude order. The reference currents $I_{REF\_1}$ through $I_{REF\_3}$ thus represent three possible magnitudes of the reference current $I_{REF}$. The timing diagram 150 also demonstrates the threshold magnitudes of each of the reference currents $I_{REF\_1}$ through $I_{REF\_3}$, demonstrated in the example of FIG. 5 as $I_{REF\_1\_FINAL}$ through $I_{REF\_3\_FINAL}$, respectively. The final magnitudes $I_{REF\_1\_FINAL}$ through $I_{REF\_3\_FINAL}$ vary in magnitude based on the threshold magnitudes being a ratio of the initial values of the reference currents $I_{REF\_1}$ through $I_{REF\_3}$, such as defined by the signal THRESH.

At a time prior to a time $T_0$, the preamplifier system 10 is in a write cycle of operation, and is thus writing data to the magnetic disk via the magnetic disk write head 12. At the time $T_0$, the preamplifier system 10 concludes the write cycle and initiates a degauss period. Thus, as demonstrated in the example of FIG. 5, each of the separate reference currents $I_{REF\_1}$ through $I_{REF\_3}$ begin to decay, such as based on the generation of the decay current $I_{DECAY}$ flowing from the node 54, as described above.

Because the decay current $I_{DECAY}$ is proportional to the square-root of the initial magnitude $I_{REF\_INIT}$ of the reference current $I_{REF}$, as described above, the reference currents $I_{REF\_1}$ through $I_{REF\_3}$ are demonstrated in the example of FIG. 5 as decaying at different rates. Specifically, the reference current $I_{REF\_1}$ decays at the fastest rate because it has the greatest initial magnitude and the reference current $I_{REF\_3}$ decays at the slowest rate because it has the least initial magnitude. As a result, each of the reference currents $I_{REF\_1}$ through $I_{REF\_3}$ decay to the respective threshold magnitudes $I_{REF\_1\_FINAL}$ through $I_{REF\_3\_FINAL}$ substantially concurrently at a time $T_1$. Therefore, at the time $T_1$, the cutoff circuit 62 asserts the signal $I_{REF}\_CUT$ to open the switch $SW_1$, as demonstrated in the example of FIG. 3. Accordingly, the reference currents $I_{REF\_1}$ through $I_{REF\_3}$ are demonstrated in the example of FIG. 5 as reducing to a magnitude of zero at the time $T_1$. Thus, at the time $T_1$, the preamplifier system 10 enters a read cycle, such that an associated MR read head can read data from the magnetic disk without substantial magnetic interference.

It is to be understood that the timing diagram 150 is demonstrated as an ideal timing diagram in the example of FIG. 5 for simplicity. As such, variations in respective magnitudes of the reference currents $I_{REF\_1}$ through $I_{REF\_3}$, as well as the respective threshold magnitudes $I_{REF\_1\_FINAL}$ through $I_{REF\_3\_FINAL}$, may not be demonstrated in the example of FIG. 5. Furthermore, it is to be understood that the respective threshold magnitudes $I_{REF\_1\_FINAL}$ through $I_{REF\_3\_FINAL}$ may not be to scale relative to each other and to the respective magnitudes of the reference currents $I_{REF\_1}$ through $I_{REF\_3}$. Accordingly, the timing diagram 150 in the example of FIG. 5 is merely demonstrative of the time duration of the degauss period being independent of the initial value of the reference current $I_{REF}$.

Figure 6:
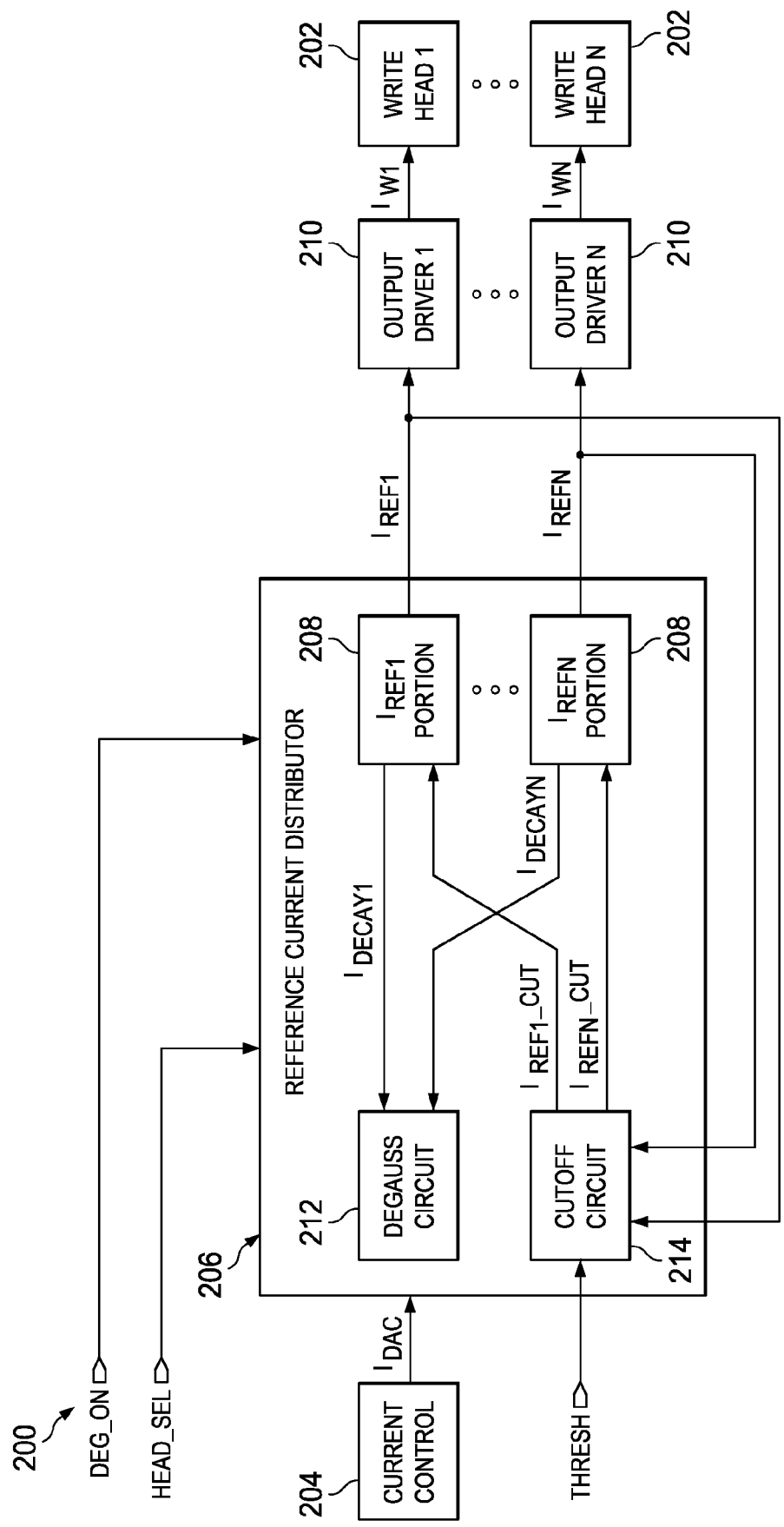
FIG. 6 illustrates another example of a preamplifier system in accordance with an aspect of the invention.

FIG. 6 illustrates an example of a preamplifier system 200 in accordance with an aspect of the invention. Similar to the preamplifier system 10 in the example of FIG. 1, the preamplifier system 200 can be implemented in a magnetic diskdrive system. However, in the example of FIG. 6, the preamplifier system 200 can be implemented to write data onto one or more magnetic disks (not shown) via a plurality of magnetic disk write heads 202. In the example of FIG. 6, the magnetic disk write heads 202 are demonstrated as numbering from 1 to N, where N is a positive integer greater than one.

The preamplifier system 200 includes a current controller 204 that converts digital data to an analog control current $I_{DAC}$ that is indicative of an absolute magnitude of one or more of N write currents $I_{W1}$ through $I_{WN}$ that correspond to data that is to be written to the magnetic disk(s). The control current $I_{DAC}$ is provided as a control signal to a reference current distributor 206. The reference current distributor 206 includes a plurality N of reference current portions 208 that are each configured to generate one of a respective plurality of reference currents $I_{REF1}$ through $I_{REFN}$ based on the control current $I_{DAC}$. Each of the reference currents $I_{REF1}$ through $I_{REFN}$ can be generated to be substantially proportional to the control current $I_{DAC}$, and can have magnitudes that are equal or distinct with respect to each other. As an example, each of the reference current portions 208 can be configured substantially similar to the reference current portion 58 in the example of FIG. 3. As such, the reference currents $I_{REF1}$ through $I_{REFN}$ can each be generated via current-mirrors from the control current $I_{DAC}$ during the write cycle.

The reference currents $I_{REF1}$ through $I_{REFN}$ are each provided to one of a respective plurality N of output drivers 210 that drive the respective reference currents $I_{REF1}$ through $I_{REFN}$ as the respective write currents $I_{W1}$ through $I_{WN}$ based on a digital data signal (not shown), similar to as described above in the example of FIG. 1. The write currents $I_{W1}$ through $I_{WN}$ can thus be provided to an inductive load in the respective magnetic disk write heads 202, such that a magnetic field generated by the inductive load can set magnetic dipole elements on the magnetic disk(s) corresponding to the data. As an example, the separate reference currents $I_{REF1}$ through $I_{REFN}$ can be selectively provided to the separate respective magnetic disk write heads 202 via a selection signal HEAD_SEL. Therefore, data can be written to a specific one magnetic disk or portion of a magnetic disk at a time based on the signal HEAD_SEL. As another example, data can be written to a plurality of separate magnetic disks or portions of a magnetic disk concurrently. The writing of data to separate magnetic disks or portions of a magnetic disk can be for redundant storage, or could be to write separate data concurrently.

The reference current distributor 206 includes a degauss circuit 212. A signal DEG_ON is provided to the reference current distributor 206 to initiate a degauss period, and thus to activate the degauss circuit 212. As an example, the signal DEG_ON can be a single bit signal to initiate the degauss period for all of the magnetic disk write heads 202, or can be a multi-bit signal to initiate degauss periods for the magnetic disk write heads 202 individually. Upon initiation of the degauss period, the degauss circuit 212 is thus configured to decay the one or more of the reference currents $I_{REF1}$ through $I_{REFN}$ from an initial magnitude to a predetermined final value.

Similar to as described above in the examples of FIGS. 1 through 4, the time duration of the degauss periods can be set substantially independent of the initial magnitudes of the reference currents $I_{REF1}$ through $I_{REFN}$. As a result, regardless of the relative initial magnitudes of the reference currents $I_{REF1}$ through $I_{REFN}$, a degauss period that is initiated for one or more of the reference currents $I_{REF1}$ through $I_{REFN}$ has an approximately equal time duration. In the example of FIG. 6, the degauss circuit 212 generates a respective plurality of decay currents $I_{DECAY1}$ through $I_{DECAYN}$. In the example of FIG. 6, the plurality of decay currents $I_{DECAY1}$ through $I_{DECAYN}$ flow from the reference current portions 208, such as to a negative rail voltage $V_{NEG}$, similar to as described above in the example of FIGS. 3 and 4. However, it is to be understood that the plurality of decay currents $I_{DECAY1}$ through $I_{DECAYN}$ could flow to the reference current portions 208, such as based on being sourced from a positive rail voltage. In addition, as demonstrated in the example of FIG. 6, the reference current distributor 206 includes a single degauss circuit 212 that generates a plurality of decay currents $I_{DECAY1}$ through $I_{DECAYN}$, such as based on N current-mirrors. However, it is to be understood that each of the reference current portions 208 could include separate and individual degauss circuits for individually generating the plurality of decay currents $I_{DECAY1}$ through $I_{DECAYN}$.

Similar to as described above in the examples of FIGS. 3 and 4, the plurality of decay currents $I_{DECAY1}$ through $I_{DECAYN}$ can each have a magnitude that is proportional to the square-root of the initial magnitude of the respective one of the reference currents $I_{REF1}$ through $I_{REFN}$. As a result, the transistor in the respective reference current portion 208 is deactivated at a rate that is dependent on the initial magnitude of the respective one of the reference currents $I_{REF1}$ through $I_{REFN}$. Therefore, the time duration of the degauss period is independent of the initial magnitude of the respective magnitudes of the reference currents $I_{REF1}$ through $I_{REFN}$. Accordingly, variations in the magnitudes of the write currents $I_{W1}$ through $I_{WN}$ are irrelevant to a determination of a time necessary to degauss the magnetic disk write head 202, such that the magnetic disk write head 202 can be degaussed rapidly and accurately in switching from a write cycle to a read cycle.

The reference current distributor 206 also includes a cutoff circuit 214 that is configured to monitor the magnitudes of the reference currents $I_{REF1}$ through $I_{REFN}$. The example of FIG. 6 demonstrates the reference currents $I_{REF1}$ through $I_{REFN}$ being provided to the cutoff circuit 214. As an example, the reference currents $I_{REF1}$ through $I_{REFN}$ can be mirrored to the cutoff circuit 214. In addition, a signal THRESH can be provided to the cutoff circuit 214 that is indicative of a threshold magnitude associated with the reference currents $I_{REF1}$ through $I_{REFN}$. The threshold magnitude can be a single threshold magnitude for all of the reference currents $I_{REF1}$ through $I_{REFN}$, or can set individual threshold magnitudes for the reference currents $I_{REF1}$ through $I_{REFN}$. As such, upon the reference currents $I_{REF1}$ through $I_{REFN}$ decaying to respective threshold magnitudes, the cutoff circuit 214 deactivates the respective reference currents $I_{REF1}$ through $I_{REFN}$, thus concluding the degauss period and initiating the read cycle. Accordingly, the signal THRESH can define magnitudes of the reference currents $I_{REF1}$ through $I_{REFN}$ at which the magnetic field of the respective magnetic disk write heads 202 are substantially sufficiently discharged.

It is to be understood that the preamplifier system 200 is not intended to be limited to the example of FIG. 6. As an example, although the example of FIG. 6 demonstrates a single control current $I_{DAC}$, it is to be understood that multiple control currents $I_{DAC}$ can be generated, such as one for each of the magnetic disk write heads 202. Thus, write head characteristics and/or temperature can be optimized for each of the magnetic disk write heads 202 individually. As another example, it is to be understood that one or more of the components in the preamplifier system 200 can be integrated components. Specifically, the reference current distributor 206 can be configured as an IC, which can also include the current controller 204 and/or one or more of the output drivers 210. Accordingly, the preamplifier system 200 can be configured in any of a variety of ways.

Figure 7:
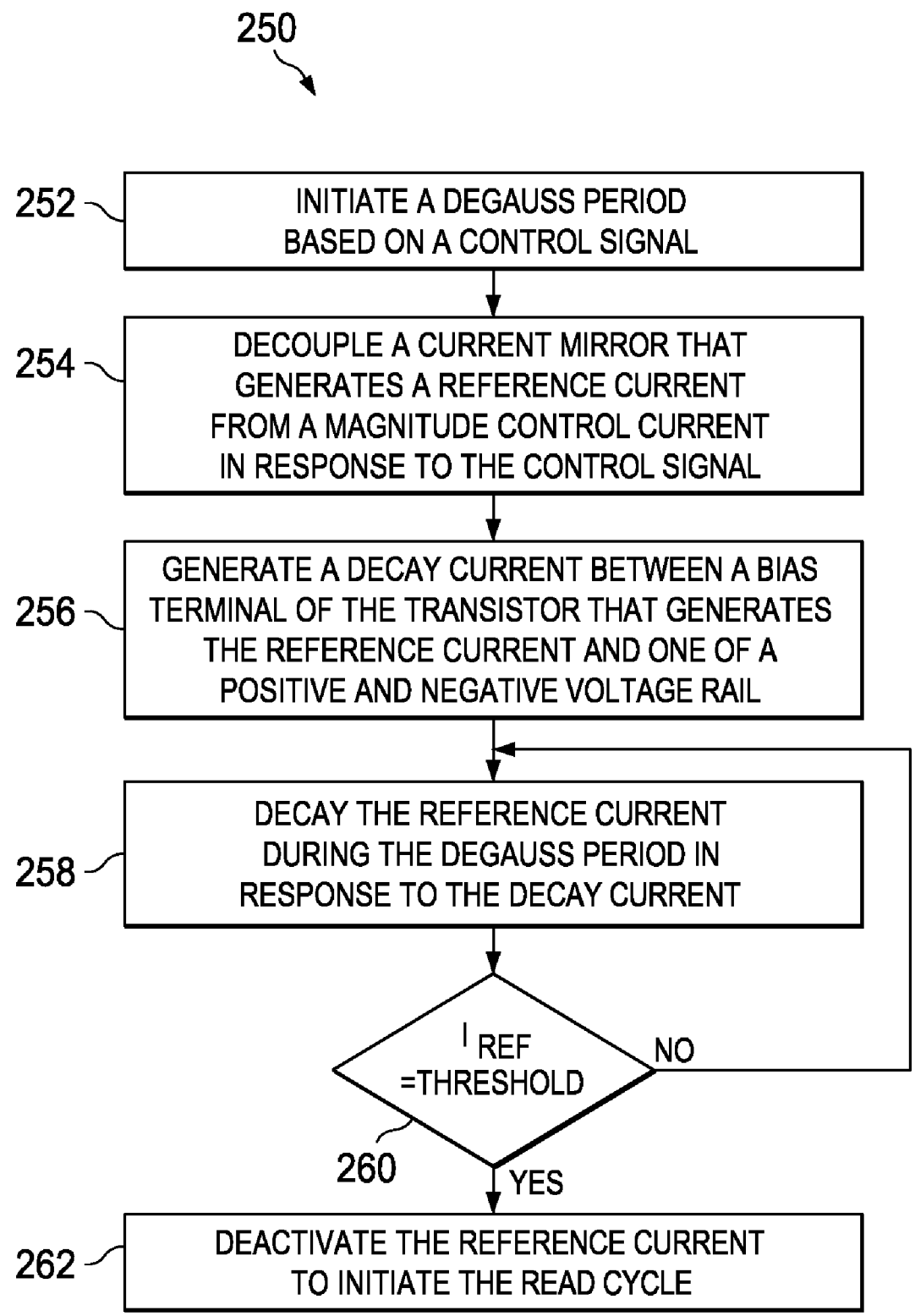
FIG. 7 illustrates an example of a method for degaussing a magnetic disk write head in accordance with an aspect of the invention.

In view of the foregoing structural and functional features described above, certain methods will be better appreciated with reference to FIG. 7. It is to be understood and appreciated that the illustrated actions, in other embodiments, may occur in different orders and/or concurrently with other actions. Moreover, not all illustrated features may be required to implement a method.

FIG. 7 illustrates an example of a method 250 for degaussing a magnetic disk write head in accordance with an aspect of the invention. At 252, a degauss period is initiated based on a control signal. The degauss period can be subsequent to the conclusion of a write cycle before the initiation of a read cycle. At 254, a current-mirror that generates a reference current from a magnitude control current is decoupled in response to the control signal. The magnitude control current can correspond to a magnitude setting of a write current corresponding to data that is to be written to the magnetic disk via a digital data signal. The reference current can be a current that is provided to an output driver to set an absolute value of the write current to the magnetic disk write head.

At 256, a decay current is generated between a bias terminal of the transistor that generates the reference current and one of a positive and negative voltage rail. The decay current can have a magnitude that is functionally related to the initial magnitude of the reference current, such as square-root proportional, such that the degauss period has a time duration that is independent of the initial magnitude of the reference current. At 258, the reference current is decayed during the degauss period in response to the decay current. The decay current can discharge a gate capacitor of an N-type transistor through which the reference current flows, or can add charge to a gate capacitor of a P-type transistor through which the current flows. Thus, the transistor is deactivated throughout the degauss period to decay the reference current.

At 260, the method determines if the magnitude of the reference current has reached a predetermined threshold. As an example, the predetermined threshold can be a ratio or proportion of the initial magnitude of the reference current, such as 5-20%. If the reference current has not decreased to a magnitude of the predetermined threshold, the method remains at 258. Upon the reference current magnitude being equal to the predetermined threshold, the method proceeds to 262. At 262, the reference current is deactivated to initiate a read cycle. The deactivation of the reference current can be based on opening a switch. Thus, in the read cycle, the MR read head can read data from the magnetic disk without substantial magnetic interference from the degaussed magnetic disk write head.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A preamplifier system for a magnetic disk-drive, the system comprising:
a current distributor configured to generate a reference current and to decay the reference current from a first magnitude to a second magnitude during a degauss period to degauss a magnetic disk write head, the degauss period defining a transition from a write cycle to a read cycle of the magnetic disk-drive and having a predetermined time duration that is independent of the first magnitude of the reference current during the write cycle; and
an output driver configured to provide a write current to the magnetic disk write head having a magnitude with an absolute value that is based on the reference current.

2. The system of claim 1, further comprising a current controller configured to generate a control current based on a digital signal, wherein the current distributor comprises a current-mirror that comprises a first mirror transistor through which the control current flows and a second mirror transistor through which the reference current flows, such that the control current sets a magnitude of the reference current during the write cycle.

3. The system of claim 2, wherein the current distributor further comprises a switch that is opened at a beginning of the degauss period to decouple bias terminals associated with each of the first and second mirror transistors.

4. The system of claim 2, further comprising a degauss circuit configured to conduct a decay current from a bias terminal of the second mirror transistor, the decay current having a magnitude that is functionally related to the first magnitude of the reference current, the magnitude being one of a positive magnitude and a negative magnitude depending on a type of the second mirror transistor.

5. The system of claim 4, wherein the degauss circuit is configured to provide the decay current as having a magnitude that is proportional to a square-root of the first magnitude of the reference current.

6. The system of claim 4, wherein the degauss circuit is configured to provide the decay current as having a magnitude that is a square-root of a product of a predetermined constant and a second current that is proportional to the first magnitude of the reference current.

7. The system of claim 4, wherein the degauss circuit comprises:
a first transistor that provides a current path for a second current that is one of sourced from a positive voltage rail and sunk to a negative voltage rail, the second current having a magnitude that is proportional to the first magnitude of the reference current;
a second transistor that provides a current path for a substantially constant current having a magnitude that is set to define the predetermined time duration of the degauss period, the current path being coupled to a bias terminal of the first transistor; and
a third transistor and a fourth transistor connected in series to provide a series current path for the decay current, the third transistor having a bias terminal that is coupled to a bias terminal of the second transistor, the fourth transistor being diode-connected.

8. The system of claim 7, wherein the first, second, third, and fourth transistors are configured as being substantially identical to provide the decay current as having a magnitude that is approximately equal to a square-root of a product the magnitudes of the second current and the substantially constant current.

9. The system of claim 1, wherein the current distributor comprises a current source transistor that is configured to provide the reference current as having a magnitude that is proportional to a control signal during the write cycle.

10. The system of claim 9, wherein the current distributor further comprises a degauss circuit configured to decrease a bias of the current source transistor during the degauss period at a rate that varies based on the first magnitude of the reference current.

11. The system of claim 1, further comprising at least one additional output driver configured to provide the write current to a respective at least one additional magnetic disk write head, the current distributor being configured to selectively provide the reference current to at least one of the output driver and the at least one additional output driver.

12. The system of claim 1, further comprising a cutoff circuit configured to cause the reference current to terminate in response to detecting that the reference current has decayed to the second magnitude.

13. The system of claim 12, wherein the second magnitude is set as a threshold for the reference current as a predetermined percentage of the reference current.

14. A method for degaussing a magnetic disk write head in a magnetic disk-drive, the method comprising:
initiating a degauss period in response to a degauss control signal in response to concluding a write cycle associated with the magnetic disk-drive;
decoupling a current-mirror that comprises a first mirror transistor that is configured to conduct a magnitude control current and a second mirror transistor configured to conduct a reference current that is provided to cause data to be written to the magnetic disk write head via at least one output driver;
generating a decay current that flows from a bias terminal of the second mirror transistor, the decay current having a magnitude that is proportional to a square-root of an initial magnitude of the reference current and is one of positive and negative; and
decaying the reference current from the initial magnitude to a predetermined threshold magnitude during the degauss period in response to the decay current.

15. The method of claim 14, wherein initiating the degauss period comprises initiating the degauss period as having a time duration that is substantially independent of the initial magnitude of the reference current.

16. The method of claim 14, wherein generating the decay current comprises:
generating a second current that is proportional to the magnitude control current; and setting the magnitude of the decay current based on a magnitude of the second current and a magnitude of a substantially constant current that sets a time duration of the degauss period.

17. The method of claim 16, wherein setting the magnitude of the decay current further comprises:
conducting the second current through a first transistor;
conducting the substantially constant current through a second transistor, the second transistor having a bias magnitude that is set based on the magnitude of the second current; and
conducting the decay current through a series path comprising a third and fourth transistor, the third transistor having a bias magnitude that is approximately equal to the second transistor and the fourth transistor being diode-connected.

18. The method of claim 17, wherein setting the magnitude of the decay current comprises setting the magnitude of the decay current to be approximately equal to a square-root of a product of the magnitudes of the second current and the substantially constant current based on the first, second, third, and fourth transistors being configured substantially identical.

19. The method of claim 17, further comprising cutting off the reference current during the degauss period in response to detecting that the reference current has decayed to the predetermined threshold magnitude.

20. A current distribution system for a magnetic disk-drive, the system comprising:
means for generating at least one reference current based on an input control signal;
means for driving at least one write current to a respective at least one magnetic disk write head during a write cycle, the at least one write current having a magnitude depending on the at least one reference current; and
means for decaying the at least one reference current during a degauss period from a first magnitude to a second magnitude so that the write current decreases proportionally, the degauss period defining a transition from the write cycle to a read cycle of the magnetic disk-drive and having a predetermined time duration that is independent of the first magnitude of the reference current during the write cycle.

21. The system of claim 20, wherein the means for generating the at least one reference current comprises at least one bias terminal configured to set the magnitude of the respective at least one reference current, and
wherein the means for decaying comprises means for generating a decay current that flows from the at least one bias terminal to decrease the magnitude of the at least one reference current during the degauss period.

22. The system of claim 20, wherein a magnitude of the decay current during the degauss period is proportional to a square-root of the first magnitude of the at least one reference current.

23. An integrated circuit comprising the current distributor system of claim 20.

* * * * *